(12) United States Patent
Lai et al.

(10) Patent No.: US 10,782,078 B2
(45) Date of Patent: Sep. 22, 2020

(54) HEAT DISSIPATION COATING LAYER AND MANUFACTURING METHOD THEREOF

(71) Applicant: BGT MATERIALS LIMITED, Manchester (GB)

(72) Inventors: Chung-Ping Lai, Hsinchu County (TW); Kuo-Hsin Chang, Chiayi (TW); Jia-Cing Chen, Tainan (TW); We-Jei Ke, Hsinchu (TW)

(73) Assignee: BGT Materials Limited, Manchester (GB)

( * ) Notice: Subject to any disclaimer, the term of this patent is extended or adjusted under 35 U.S.C. 154(b) by 77 days.

(21) Appl. No.: 16/177,396

(22) Filed: Oct. 31, 2018

(65) Prior Publication Data

US 2019/0154367 A1 May 23, 2019

Related U.S. Application Data

(63) Continuation of application No. 15/263,368, filed on Sep. 13, 2016, now abandoned.

(51) Int. Cl.
| | | |
|---|---|---|
| *B32B 15/082* | (2006.01) | |
| *F28F 13/00* | (2006.01) | |
| *C09D 7/40* | (2018.01) | |
| *C09D 5/00* | (2006.01) | |
| *C09D 175/04* | (2006.01) | |
| *C09K 5/14* | (2006.01) | |
| *C08K 3/08* | (2006.01) | |

(52) U.S. Cl.
CPC .......... *F28F 13/003* (2013.01); *B32B 15/082* (2013.01); *C09D 5/00* (2013.01); *C09D 7/68* (2018.01); *C09D 175/04* (2013.01); *C09K 5/14* (2013.01); *B32B 2307/302* (2013.01); *C08K 3/08* (2013.01); *C08K 2003/0812* (2013.01)

(58) Field of Classification Search
CPC ...... C09D 163/00; C09D 175/04; C09D 5/00; C09D 7/61; C09D 7/68; C09D 7/69; C09D 7/80; C09K 5/14; F28F 13/003; B32B 2307/302; B32B 15/082; C08K 2003/0812; C08K 3/08
See application file for complete search history.

(56) References Cited

U.S. PATENT DOCUMENTS

| | | | |
|---|---|---|---|
| 2007/0189944 A1* | 8/2007 | Kirkland | B01J 20/28004 423/118.1 |
| 2007/0249755 A1 | 10/2007 | Hiroshige et al. | |
| 2009/0050856 A1* | 2/2009 | Kosowsky | B82Y 10/00 252/502 |

FOREIGN PATENT DOCUMENTS

| | | | | |
|---|---|---|---|---|
| CN | 102181212 A | 9/2011 | | |
| CN | 102368482 A | 3/2012 | | |
| EP | 0559092 A1 | 9/1993 | | |
| WO | WO-9822388 A1 * | 5/1998 | ................ | C01F 7/02 |
| WO | WO-2017002357 A1 * | 1/2017 | .......... | B01J 35/0006 |

* cited by examiner

*Primary Examiner* — Irina S Zemel
(74) *Attorney, Agent, or Firm* — Chun-Ming Shih; LanWay IPR Services

(57) ABSTRACT

A heat dissipation coating layer contains: a binder and a core-shell heat dissipation filler. The core-shell heat dissipation filler is synthesized in a water bathing process at the temperature within 20° C. to 100° C. The core-shell heat dissipation filler includes a metal core and a shell composed of the mixture of oxide and hydroxide shell. Here the metal core has metal particles, and the shell has a porous structure consisted of a mixture of metal oxide and porous metal hydroxide.

14 Claims, 5 Drawing Sheets

HEAT DISSIPATION COATING LAYER AND MANUFACTURING METHOD THEREOF

BACKGROUND OF THE INVENTION

This application is a Continuation-in-Part of application Ser. No. 15/263,368, filed on Sep. 13, 2016.

FIELD OF THE INVENTION

The present invention relates to a heat dissipation coating layer which contains a core-shell heat dissipation filler including a metal core and a shell consisting of a mixture of oxide and hydroxide, wherein the metal core has metal particles, and the shell has a porous structure composed of a mixture of oxide and hydroxide.

BACKGROUND OF THE INVENTION

A conventional thermally conductive composition is disclosed in US Publication No. 20070249755 A1. A heat dissipation material and a method of manufacturing thereof are disclosed in CN 102181212A. The thermally conductive composition and the heat dissipation material dissipates heat in a conduction manner or in a convention manner, and far-infrared emission rate of the heat dissipation material is more than 0.80 or a thermal conductivity is more than 5 W/m.K.

A metal foam heat dissipator is disclosed in EP0559092 A1 and contains a metal frame adhered on the heat dissipator made of metal, however, a heat contact surface is small and a large thermal contact resistance exists between the heat dissipator and the metal frame.

A porous metal heat dissipator is taught in CN 102368482A, but is cannot connect the metal frame with the heat dissipator integrally.

A hydrothermal method or acid-etching method is disclosed in [ChemCatChem, 6(2014) 2642], [Cent. Eur. J.Phys, 8(2010) 1015] and is applied to form porous $Al_2O_3$ core and a porous $Al_2O_3$ shell. However, such a method will cause poor thermal conductivity and toxic solvents to pollute environment.

The present invention has arisen to mitigate and/or obviate the afore-described disadvantages.

SUMMARY OF THE INVENTION

The primary objective of the present invention is to provide a heat dissipation coating layer which contains a core-shell heat dissipation filler including a metal core and a shell consisting of a mixture of oxide and hydroxide, wherein the metal core has metal particles, and the shell has a porous structure composed of a mixture of oxide and hydroxide, thus enhancing a heat dissipation rate or a cooling rate of the heat dissipation coating layer.

To obtain above-mentioned objective, a heat dissipation coating layer provided by the present invention contains: a binder and a heat dissipation filler. The heat dissipation filler is synthesized in a water bathing process. During the water bathing process, the water results in an oxidation or corrosion reaction on the surface of metal particle, which will form the core-shell powder, i.e. a metal core and a shell consisting of a mixture of oxide and hydroxide.

The heat dissipation filler is a core-shell powder, which includes a metal core and a shell consisting of a mixture of oxide and hydroxide, herein the metal core has metal particles, and the shell has a porous structure composed of a mixture of oxide and hydroxide. Here the shell thickness of core-shell heat dissipation filler is less than 500 nm.

Preferably, a size of the metal core of core-shell heat dissipation filler is within 0.1 μm to 200 μm.

Preferably, the metal core is any one of Al, In, Sn, Zn, Cu, Ag, Co, Ni, Sb, Bi, Fe, Mn, Cr, Mo, W, V, Ti, Zr, Mg, and Ca.

Preferably, beside the above core-shell heat dissipation filler, the heat dissipation coating layer further contains any one of ceramic fillers, metal oxide fillers, and hydroxide fillers.

Preferably, the binder is any one of thermoplastic resin, silicone resin, methacrylic resin, urethane resin, and epoxy resin.

Preferably, a reaction temperature of the water bathing process is within 20° C. to 100° C.

Preferably, a reaction temperature of the water bathing process is within 50° C. to 100° C.

A method of manufacturing the heat dissipation coating layer comprising steps of:

Synthesizing the core-shell heat dissipation filler by a water bathing process, wherein the metal core has metal particles, and the shell has a porous structure composed of a mixture of oxide and hydroxide, hence the metal core and the shell consisting of a mixture of oxide and hydroxide can form a core-shell heat dissipation filler; and Washing the core-shell heat dissipation filler by using water; and drying the heat dissipation filler.

The method also contains steps of: mixing the heat dissipation filler and the binder evenly so as to produce the heat dissipation coating layer. The method further contains step of: mixing the heat dissipation filler, the binder, and solvent together.

DETAILED DESCRIPTION OF THE PREFERRED EMBODIMENTS

With reference to FIGS. 1-6, a heat dissipation coating layer according to a preferred embodiment of the present invention comprises: a core-shell heat dissipation filler 10 and a binder 20, wherein the heat dissipation filler 10 includes a metal core 11 and a shell 12 surrounding the metal core 11, wherein the metal core 11 has metal particles, and the shell 12 has a porous structure composed of a mixture of oxide and hydroxide.

Figure 1:
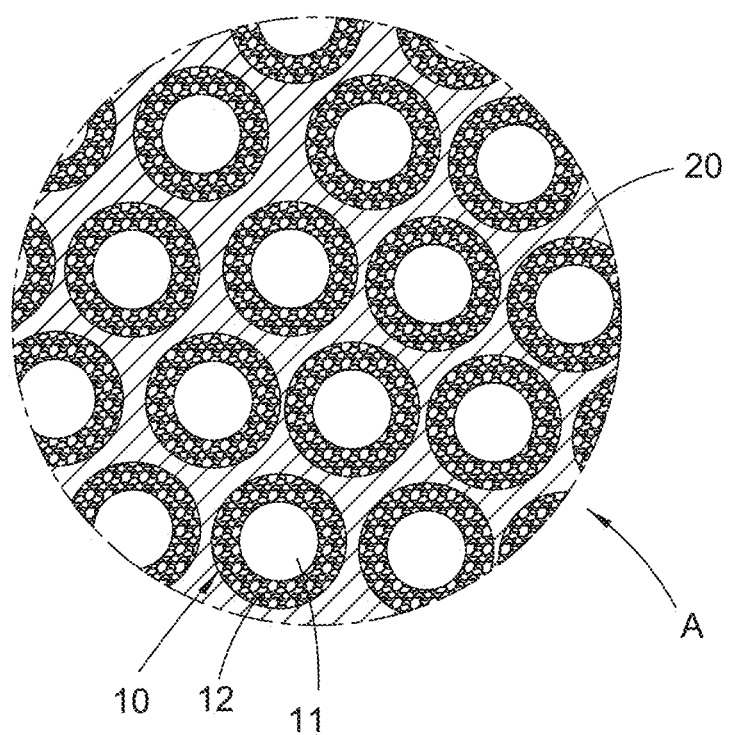
FIG. 1 is schematic view showing a heat dissipation coating layer according to a preferred embodiment of the present invention.
Figure 2:
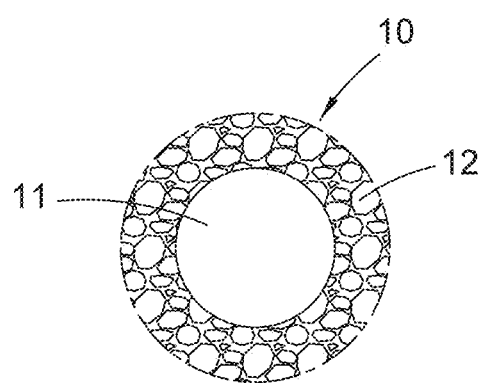
FIG. 2 is an amplified schematic view of a part of FIG. 1.
Figure 3:
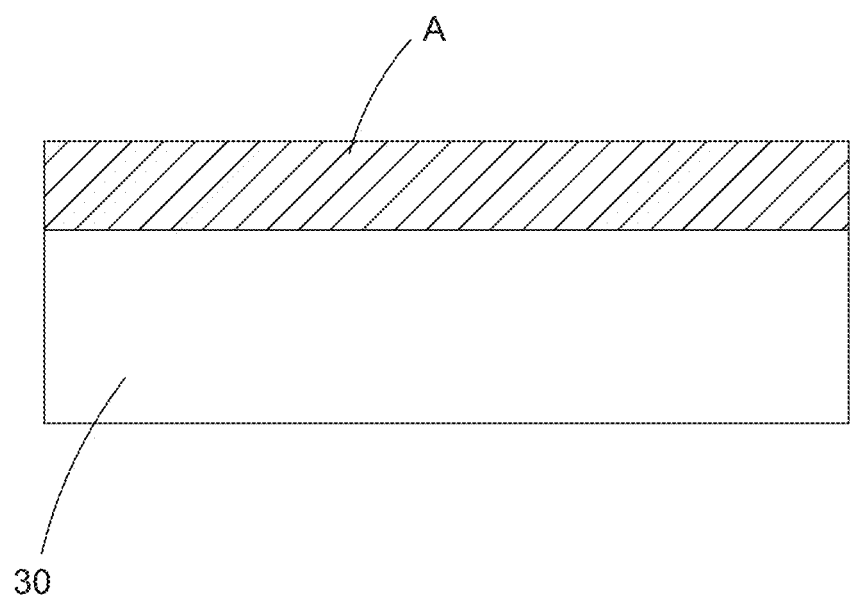
FIG. 3 is a schematic view showing the application of the heat dissipation coating layer according to the preferred embodiment of the present invention.

Referring to FIG. 3, the heat dissipation coating layer A is coated on an apparatus 30, wherein the heat dissipation filler 10 includes the metal core 11 and the shell 12 consisting of a mixture of oxide and hydroxide, and the shell 12 has a porous structure composed of a mixture of oxide and hydroxide. The shell 12 is synthesized by a water bathing process at the temperature within 20° C. to 100° C. The shell 12 has the porous structure, hence the shell 12 enhances a heat dissipation rate or a cooling rate of the apparatus 30 in a conduction manner or in a convention manner.

The heat dissipation coating layer A is applicable for the apparatus 30, such as a filament, a grip, a column, a heat sink, and a case, wherein the apparatus 30 is made of any one or any combination of any two or more of plastic, ceramic, and metal.

A size of the metal core 11 of core-shell heat dissipation filler is within 0.1 μm to 200 μm, and a thickness of the shell of core-shell heat dissipation filler is less than 500 nm.

The metal core 11 is any one of Al, In, Sn, Zn, Cu, Ag, Co, Ni, Sb, Bi, Fe, Mn, Cr, Mo, W, V, Ti, Zr, Mg, and Ca.

In one embodiment, the metal core 11 is Al.

The binder 20 is any one of thermoplastic resin, silicone resin, methacrylic resin, urethane resin, and epoxy resin.

The heat dissipation coating layer of the present invention further comprises any one of ceramics filler, metal oxide filler, and hydroxide filler.

To enhance an area of the heat dissipation filler 10 of the heat dissipation coating layer, a method of manufacturing the heat dissipation coating layer A comprises steps of:

Synthesizing the core-shell heat dissipation filler 10 in the water bathing process, wherein the metal core 11 has the metal particles, and the shell 12 has the porous structure composed of a mixture of oxide and hydroxide, hence the metal core 11 and the shell 12 consisting of a mixture of oxide and hydroxide form the core-shell heat dissipation filler 10; and Mixing the core-shell heat dissipation filler 10 and the binder 20 evenly so as to produce the heat dissipation coating layer A.

A reaction temperature of the water bathing process is within 20° C. to 100° C.

Preferably, the reaction temperature of the water bathing process is within 50° C. to 100° C.

During water bathing process, the water results in an oxidation or corrosion reaction on the surface of metal powder, which forms the core-shell powder, i.e. a metal core and a shell consisting of a mixture of oxide and hydroxide.

In one embodiment, the method of manufacturing the heat dissipation coating layer A comprises steps of:

Mixing the core-shell heat dissipation filler 10, the binder, and a solvent together, wherein the solvent is any one of isopropyl alcohol (IPA), methyl-2-pyrrolidone (NMP), ethanol, glycerol, ethylene glycol, silicon oil, butanol, propylene glycol monomethyl ether (PGME), and propylene glycol monomethyl ether acetate (PGMEA).

To evaluate heat dissipation rate of the heat dissipation coating layer A of the present invention, three samples made of copper column are provided and they are:

sample 1 is made of the copper column without coating the heat dissipation coating layer;

sample 2 is made of the copper column with coating a normal heat dissipation coating layer. Here the heat dissipation coating layer includes the normal heat dissipation filler made of raw aluminum particles; and sample 3 is made of the copper column with coating the heat dissipation coating layer. Here the heat dissipation coating layer includes the core-shell heat dissipation filler in this invention.

Figure 6:
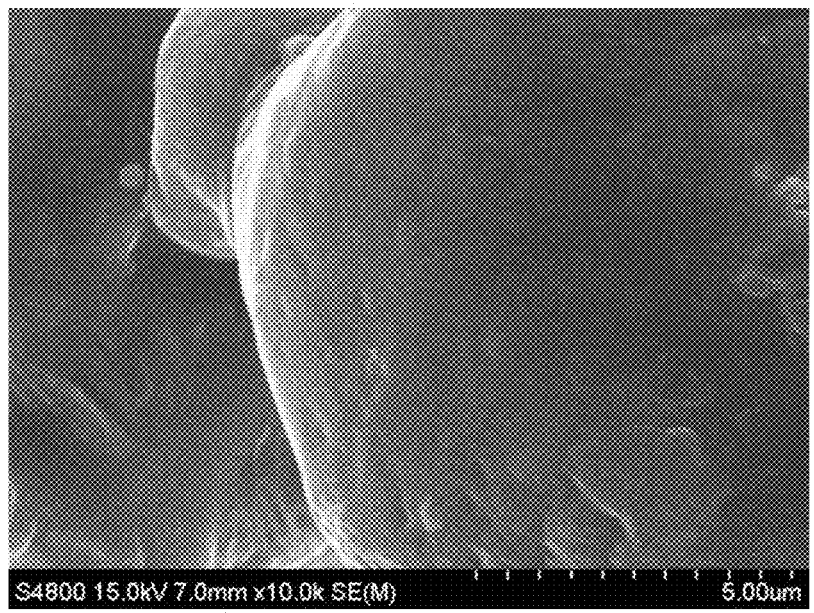
FIG. 6 shows an image of the sample 2 scanned by the scanning electron microscope (SEM).

A method of manufacturing the heat dissipation coating layer on the sample 2 contains steps of:

Providing and drying aluminum powders of 30 g in a temperature of 140° C. in a vacuum oven for 8 hours, wherein a size of each of the aluminum powders is 10 μm, and an image of the aluminum powders scanned by a scanning electron microscope (SEM) is shown in FIG. 6, wherein the heat dissipation coating layer produces after drying the aluminum powders, and the heat dissipation coating layer consists of 18.70 wt % of the aluminum powders, 5.80 wt % of binder, and 75.50 wt % of isopropyl alcohol (IPA) used as solvent so as to reduce stickiness of the heat dissipation coating layer;

Mixing the aluminum powders, the binder, and the isopropyl alcohol (IPA) together by using a planetary mixer for 1 hour; and Spraying the heat dissipation coating layer on a cooper column so as to test the heat dissipation rate of the heat dissipation coating layer on the sample 2.

Figure 5:
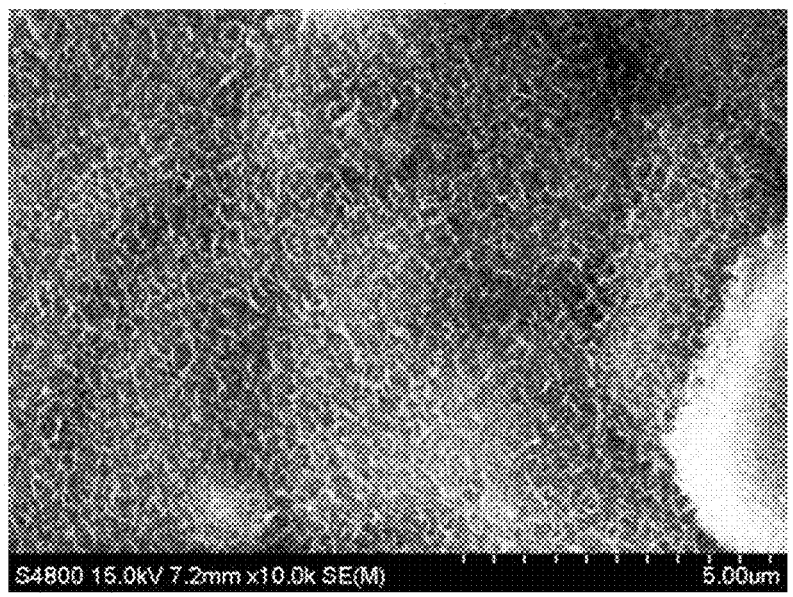
FIG. 5 shows an image of the sample 3 scanned by a scanning electron microscope (SEM).

A method of manufacturing the heat dissipation coating layer on the sample 3 contains steps of:

Providing and placing aluminum powders of 30 g in a beaker of 500 ml, wherein a size of each of the aluminum powders is 10 μm;

Adding deionized water of 300 g into the beaker and synthesizing the core-shell heat dissipation filler in a water bathing process in a temperature of 323K for 1 hour, wherein the metal core has aluminum particles, and the shell has a porous structure consisting of the mixture of aluminum oxide and aluminum hydroxide, thus producing the core-shell heat dissipation filler of the present invention;

Washing the core-shell heat dissipation filler 10 by using water;

Drying the core-shell heat dissipation filler 10 in a temperature of 140° C. in a vacuum oven for 8 hours, wherein an image of the core-shell heat dissipation filler 10 scanned by the scanning electron microscope (SEM) is shown in FIG. 5, and the heat dissipation coating layer produces after being dried, wherein the heat dissipation coating layer consists of 18.70 wt % of the core-shell aluminum-based heat dissipation powders, 5.80 wt % of binder, and 75.50 wt % of isopropyl alcohol (IPA) used as solvent so as to reduce stickiness of the heat dissipation coating layer;

Mixing the aluminum-based core-shell heat dissipation powders, the binder, and the isopropyl alcohol (IPA) by using a planetary mixer for 1 hour; and Spraying the heat dissipation coating layer on the copper column so as to test heat dissipation rate of the heat dissipation coating layer on the sample 3.

Preferably, the sample 1, the sample 2, and the sample 3 are tested according to steps of:

(1) Placing the sample 1, the sample 2, and the sample 3 in an oven and heating the sample 1, the sample 2, and the sample 3 in a temperature of 100° C. for 30 minutes; and (2) Removing the sample 1, the sample 2, and the sample 3 out of the oven and cooling the sample 1, the sample 2, and the sample 3 in a room temperature.

Figure 4:
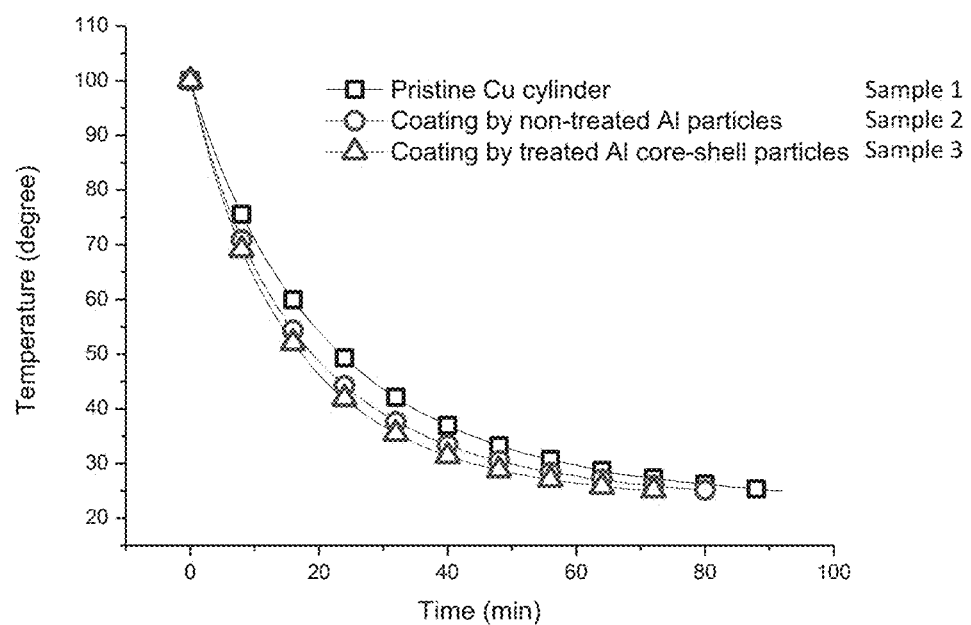
FIG. 4 is a schematic view showing testing result of sample 1, sample 2 and sample 3 of the heat dissipation coating layer according to the preferred embodiment of the present invention.

Thereafter, cooling curves of the sample 1, the sample 2, and the sample 3 are illustrated in FIG. 4.

Thereby, a heat dissipation rate of the sample 3, denoted by Coating by treated aluminum-based core-shell particles of FIG. 4, is more brilliant than sample 1 (designed by Pristine Cu Cylinder) of FIG. 4) and the sample 2 (presented by Coating by non-treated Al particles of FIG. 4).

While the preferred embodiments of the invention have been set forth for the purpose of disclosure, modifications of the disclosed embodiments of the invention as well as other embodiments thereof may occur to those skilled in the art.

Accordingly, the appended claims are intended to cover all embodiments which do not depart from the spirit and scope of the invention.

What is claimed is:

1. A heat dissipation coating layer comprising: a binder and a core-shell heat dissipation filler, wherein the core-shell heat dissipation filler is synthesized in a water bathing process;
wherein the core-shell heat dissipation filler includes a metal core and a shell consisting of a mixture of an oxide and a hydroxide, wherein the metal core has metal particles, and the shell has a porous structure composed of the mixture of the oxide and the hydroxide.

2. The heat dissipation coating layer as claimed in claim 1, wherein a size of the metal core of the core-shell heat dissipation filler is within 0.1 μm to 200 μm, and a thickness of the shell of the core-shell heat dissipation is less than 500 nm.

3. The heat dissipation coating layer as claimed in claim 1, wherein the metal core is any one of Al, In, Sn, Zn, Cu, Ag, Co, Ni, Sb, Bi, Fe, Mn, Cr, Mo, W, V, Ti, Zr, Mg, or Ca.

4. The heat dissipation coating layer as claimed in claim 1 further comprising any one of ceramic fillers, metal oxide fillers, or hydroxide fillers.

5. The heat dissipation coating layer as claimed in claim 1, wherein the binder is any one of thermoplastic resin, silicone resin, methacrylic resin, urethane resin, or epoxy resin.

6. The heat dissipation coating layer as claimed in claim 1, wherein a reaction temperature of the water bathing process is within 20° C. to 100° C.

7. A method of manufacturing heat dissipation coating layer comprising steps of:
synthesizing a core-shell heat dissipation filler with a porous shell structure in a water bathing process, wherein a core has metal particles, and a shell has a porous structure composed of a mixture of a metal oxide and a porous metal hydroxide, hence a metal core and a porous shell form the core-shell heat dissipation filler; and
mixing the core-shell heat dissipation filler into a binder mixture evenly so as to produce a heat dissipation coating layer.

8. The method as claimed in claim 7, wherein a size of the metal core of core-shell heat dissipation filler is within 0.1 μm to 200 μm.

9. The method as claimed in claim 7, wherein the metal core is any one of Al, In, Sn, Zn, Cu, Ag, Co, Ni, Sb, Bi, Fe, Mn, Cr, Mo, W, V, Ti, Zr, Mg, or Ca.

10. The method as claimed in claim 7, wherein the binder is any one of thermoplastic resin, silicone resin, methacrylic resin, urethane resin, or epoxy resin.

11. The method as claimed in claim 7, wherein a reaction temperature of the water bathing process is within 20° C. to 100° C.

12. The method as claimed in claim 7, wherein a reaction temperature of the water bathing process is within 50° C. to 100° C.

13. The method as claimed in claim 7 further comprising steps of: washing the core-shell heat dissipation filler by using water; and drying the core-shell heat dissipation filler.

14. The method as claimed in claim 7, wherein the binder mixture includes a binder and a solvent.

\* \* \* \* \*